ᴜɴɪᴛᴇᴅ Sᴛᴀᴛᴇs Pᴀᴛᴇɴᴛ Oғғɪᴄᴇ

2,985,649
Patented May 23, 1961

2,985,649

DERIVATIVES OF THIABENZOPYRROCOLINE, THIABENZOPYRIDOCOLINE AND THIAZEPINE

Joseph G. Lombardino, Brooklyn, and William M. McLamore, Kew Gardens, N.Y., and Gerald D. Laubach, Niantic, Conn., assignors to Chas. Pfizer & Co., Inc., New York, N.Y., a corporation of Delaware No Drawing. Filed Sept. 17, 1959, Ser. No. 840,504

10 Claims. (Cl. 260—239.3)

This invention relates to new and useful heterocyclic compounds as well as to novel methods and intermediates for their preparation. More particularly, the present invention is concerned with novel organic nitrogen compounds which possess a unique sulfur-containing heterocyclic ring system. There is also included within the scope of this invention various pharmaceutical compositions which have as their essential active ingredient at least one of the herein described compounds.

The compounds which are included within the purview of this invention are selected from the class having the following general structural formulae:

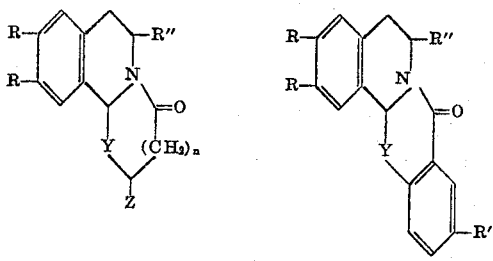

wherein R is a member of the group consisting of hydroxy, lower alkoxy and alkyl having from one to five carbon atoms and when both R groups are taken together they form a methylenedioxy group, $n$ is an integer in the range of 0–2 inclusive, Y is a member of the group consisting of sulfur, oxosulfur and dioxosulfur, Z is a member of the group consisting of hydrogen and alkyl having from one to eight carbon atoms, R′ is a member of the group consisting of hydrogen, methyl, chlorine, bromine, amino, hydroxy and methoxy, and R″ is a member of the group consisting of hydrogen and lower alkyl. The system of nomenclature employed throughout this specification is that based on the Patterson system as is indicated by the hereinbefore illustrated formulas for a 1-thia-3-oxo-1,2, 3,5,6-pentahydro-10b-H-benzopyrrocoline, a 1 - thia - 4-oxo-1,2,3,4,6,7-hexahydro-11b - H - benzopyridocoline, a naph - [1,2 - a] - 5 - oxo - 2,3,4,5,6,7-hexahydro-11b-H-[1,5a]thiazepine and a 1 - thia-6-oxo-1,6,8,9-tetrahydro-13b-H-dibenzo-[a,g]pyridocoline, respectively [e.g., see A. M. Patterson and L. T. Capell, The Ring Index, Reinhold Publishing Corporation, New York, N.Y (1940)].

In accordance with the present invention, the aforementioned thiabenzopyrrocoline, thiabenzopyridocoline, thiazepine and thiadibenzo[a,g]pyridocoline derivatives have been found to possess interesting pharmaceutical properties which render them useful as synthetic medicinals. More particularly, these compounds have been shown to exhibit utility as muscle relaxants as well as tranquilizing or hypotensive agents. Of especial value in this connection are those thiabenzopyrrocolines and thiabenzopyridocolines which have a dimethoxy grouping at the 8,9-, 9,10- and 11,12-positions, respectively.

In accordance with the process for preparing the compounds of this invention, an appropriately substituted 3,4-dihydroisoquinoline is condensed with a mercapto-substituted hydrocarbon carboxylic acid as is illustrated below by the following series of equations wherein R, Z, $n$, R′ and R″ are all as previously defined:

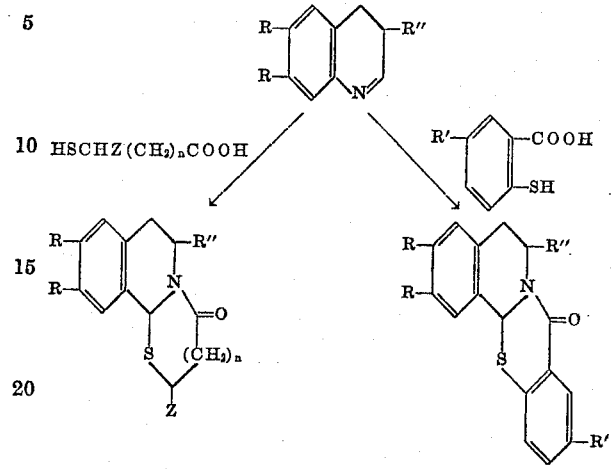

This reaction is most desirably conducted in an inert organic solvent medium at a temperature that is in the range of from about 20° C. to about 150° C. for a period of about two to about 24 hours. Preferred reaction-inert solvents in this connection includes such aromatic hydrocarbons as benzene, toluene, xylene, and the like, as well as water-miscible lower alkanols, such as methanol, ethanol, isopropanol, and the like; N,N-dissubstituted lower aliphatic hydrocarbon carboxamides, such as dimethylformamide, dimethylacetamide, diethylformamide, diethylacetamide, and the like; and the lower aliphatic hydrocarbon nitriles, such as acetonitrile, n-propionitrile, and the like. Typical examples of the various mercapto acids which may be employed in this process include such compounds as mercaptoacetic acid, α-mercaptopropionic acid, β-mercaptopropionic acid, α-mercapto-n-butyric acid, β-mercapto-n-butyric acid, γ-mercapto-n-butyric acid, α-mercapto-n-valeric acid, β-mercapto-n-valeric acid, γ - mercapto-n-valeric acid, α - mercapto-n-caproic acid, β-mercapto-n-caproic acid, γ-mercapto-n-caprylic acid, α - mercapto - n - capric acid, o-mercapto-benzoic acid, o-mercapto-5-toluic acid, o-mercapto-5-chlorobenzoic acid, o-mercapto-5-anthranilic acid, o-mercapto-5-salicylic acid, and the like. Treatment of the 2-thia compounds so obtained with either one or two moles of perbenzoic acid respectively affords the corresponding sulfoxides and sulfones.

The starting materials employed in the process of this invention are either readily available commercially or else they are easily prepared in accordance with standard organic procedures previously described in the chemical literature. For instance, the aforementioned 6.7-disubstituted-3,4-dihydroisoquinolines can be conveniently synthesized by any number of known procedures disclosed in the prior art and preferably by employing the method described by E. Spath and H. Epstein [Ber. 59, 2791 (1926)] which, in this case, involves reacting a β-[3,4-di(substituted)phenyl]alkylamine with formic acid followed by a cyclization of the resulting formamide intermediate with phosphorus pentoxide to afford the desired isoquinoline compound. The mercapto acids employed are for the most part commercially available and if necessary, they can easily be prepared from the corresponding halo acids via treatment with alkali metal mercaptides or with thiocarbamic esters followed by hydrolysis of the resulting isothioronium salts in accordance with standard organic procedures.

As previously mentioned, the compounds of the present invention are readily adapted to therapeutic use as tranquilizing or hypotensive agents in addition to being useful as sedatives in view of their ability to reduce serotonin and norepinephrine blood levels in the brain. Furthermore, the toxicity of these sulfur heterocycles has been found to be quite low when they are administered to mice in amounts that are generally considered to be sufficient to achieve the desired effects as hereinafter indicated. Moreover, no harmful pharmacological side effects have been observed as a result of their administration. The aforementioned central nervous system depressant activity of all these compounds is well illustrated by a series of tests previously described in the literature and hence, well-known to those skilled in the art. For instance, the percent decrease in serotonin and norepinephrine blood levels in the brain of the rabbit is determined in accordance with the method of P. Shore et al. [Journal of Pharmacology and Experimental Therapeutics, vol. 122, p. 295 (1958)] and S. Udenfriend et al. [Science, vol. 122, p. 972 (1955)].

In accordance with a method of treatment of the present invention, the herein described thiabenzopyrrocoline, thiabenzopyridocoline, thiazepine and thiadibenzo [a,g] pyridocoline derivatives can be administered to an agitated subject via the oral or parenteral routes as previously indicated. In general, these compounds are most desirably administered at a dosage level that is in the range of from about 50 mg. to about 500 mg. per day, although it is to be understood that variations will necessarily occur depending upon the weight of the subject being treated and the particular route of administration chosen. Nevertheless, a dosage level that is within the range of from about 0.7 g. to about 7.0 mg. per kg. of body weight per day is most desirably employed in order to achieve effective results. It is be be appreciated that still other variations may also occur in this respect, depending upon the species of animal being treated and its individual response to said treatment, as well as on the particular type of formulation chosen and the time period and interval at which such administration is carried out. In some instances, dosage levels below the lower limit of the aforesaid range may be more than adequate, while in other cases still larger dosages may be employed without causing any harmful or deleterious side effects provided that such higher dosage levels are first divided into several smaller doses that are to be administered throughout the day.

In connection with the use of the sulfur-heterocyclic compounds of this invention for the treatment of agitated subjects, it is to be noted that it may be administered alone or in combination with a pharmaceutically acceptable carrier, and that such administration can either be in single or multiple doses. More particularly, the novel compounds of this invention can be administered in a wide variety of dosage forms, i.e., they may be combined with various pharmaceutically acceptable inert carriers in the form of tablets, capsules, lozenges, troches, hard candies, powders, sprays, aqueous suspensions, injectable solutions, elixirs, syrups, and the like. Such carriers include solid diluents or fillers, sterile aqueous media and various non-toxic organic solvents. Moreover, the oral pharmaceutical compositions may be sweetened and/or flavored by means of various agents of the type commonly employed for such a purpose. In general, the therapeutically-active compounds of this invention are present in such dosage forms at concentration levels ranging from about 0.020% to about 90% by weight of the total composition, i.e., in amounts generally considered to be sufficient for providing the desired unit dosage previously indicated.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia; additionally, lubricating agents such as magnesium stearate, sodium lauryl sulfate and talc are often very useful for tabletting purposes. Solid compositions of a similar type may also be employed as fillers in soft and hard-shelled gelatin capsules; preferred materials in this connection also include lactose or milk sugar as well as high molecular weight polyethylene glycols. When aqueous suspensions and/or elixirs are desired for oral administration, the essential active ingredient can be combined with various sweetening and flavoring agents, coloring matter or dyes and, if so desired, emulsifying and/or suspending agents, together with such diluents as water, ethanol, propylene glycol, glycerin and various combinations thereof.

For purposes of parenteral administration, solutions of the herein described organic nitrogen compounds in sesame or peanut oil or in sterile aqueous-propylene glycol solutions may be employed. Such aqueous solutions should be suitably buffered if necessary and the liquid diluent rendered isotonic with sufficient saline or glucose. These particular solutions are especially suitable for intravenous, intramuscular and subcutaneous injection purposes. In this connection, the sterile aqueous media employed are readily obtained by standard techniques well-known to those in the art. For instance, distilled water is ordinarily used as the liquid diluent and the final preparation is passed through a suitable bacterial filter, such as a sintered glass filter or a diatomaceous earth or unglazed porcelain filter. Preferred filters of this type include the Berkefeld, the Chamberland and the asbestos disc-metal Seitz filter, wherein the fluid is sucked through the filter candle into a sterile container with the aid of a suction pump. Needless to say, aseptic conditions must necessarily be maintained throughout such operations which are connected with the preparation of these injectable solutions.

This invention is further illustrated by the following examples, which are not to be construed as imposing any limitations on the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

In a 250 ml. three-necked, round-bottomed flask equipped with a nitrogen-inlet tube and magnetic stirring apparatus and fitted with a dropping funnel and reflux condenser having a drying tube attached thereto, there were placed 3.8 g. (0.02 mole) of 6,7-dimethoxy-3,4-dihydroisoquinoline dissolved in 50 ml. of dry benzene. Stirring was commenced and to the resulting solution there was then added dropwise a solution consisting of 2.12 g. (0.02 mole) of $\beta$-mercapto-n-propionic acid dissolved in 50 ml. of dry benzene. After the addition was complete, the reaction mixture was refluxed under a nitrogen atmosphere for six hours and then allowed to stand at room temperature for an additional 16 hours. The resulting clear yellow solution was then evaporated under reduced pressure in order to remove the benzene, and the residual orange-colored oil so obtained was subsequently partitioned between 50 ml. of 20% sodium hydroxide and 100 ml. of diethyl ether. The ether layer was then separated and saved, while the basic aqueous layer was successively extracted with four-150 ml. portions of diethyl ether and one-50 ml. portion of benzene before it was discarded. The benzene-ether extracts were then combined and subsequently dried over anhydrous sodium sulfate. After removal of the drying agent by means of filtration, the dried filtrate was concentrated under reduced pressure until approximately one-third of its original volume remained. After allowing the concentrate to stand at about 5° C. for approximately 16 hours, crystallization occurred and there were obtained 1.43 g. (25%) of 1-thia-4-oxo-9,10-dimethoxy-1,2,3,4,6,7-hexahydro-11b-H-benzopyridocoline as a yellow solid melting at 132–135° C.

*Analysis.*—Calcd. for $C_{14}H_{17}NO_3S$: C, 60.19; H, 6.14; N, 5.02. Found: C, 60.34; H, 6.17; N, 5.83.

Example II

The procedure described in Example I is followed except that 3.24 g. (0.02 mole) of 6,7-dihydroxy-3,4-dihydroisoquinoline is reacted with 2.4 g. (0.02 mole) of β-mercapto-n-butyric acid to afford 1-thia-2-methyl-4 - oxo - 9,10 - dihydroxy - 1,2,3,4,6,7 - hexahydro-11b-H-benzopyridocoline. Similarly, 4.38 g. (0.02 mole) of 6,7-diethoxy-3,4-dihydroisoquinoline and 2.68 g. (0.02 mole) of β-mercapto-n-valeric acid react in 50 ml. of benzene to afford 1-thia-2-ethyl-4-oxo - 9,10 - diethoxy-1,2,3,4,6,7-hexahydro-11b-H-benzopyridocoline. In the same manner and employing equimolar amounts of reactants in each case, 3-methyl-6,7-di(n-butoxy)-3,4-dihydroisoquinoline and β-mercapto-n-caproic acid react to afford 1 - thia - 2 - (n-propyl)-4-oxo-6-methyl-9,10-di(n-butoxy) - 1,2,3,4,6,7-hexahydro-11b-H-benzopyridocoline; 3 - ethyl-6,7-di(isoamyloxy)-3,4-dihydroisoquinoline and β-mercapto-n-propionic acid react to afford 1-thia-4-oxo-6-ethyl-9,10-di(isoamyloxy) - 1,2,3,4,6,7 - hexahydro-11b-H-benzopyridocoline; 6,7-methylenedioxy-3,4-dihydroisoquinoline and β-mercapto-n-butyric acid react to afford 1-thia - 2 - methyl-4-oxo-9,10-methylenedioxy-1,2,3,4,6,7-hexahydro-11b-H-benzopyridocoline; 3-(n-butyl)-6,7-dimethyl-3,4-dihydroisoquinoline and β-mercapto-n-valeric acid react to afford 1-thia-2-ethyl-4-oxo-6-(n-butyl)-9,10-dimethyl-1,2,3,4,6,7-hexahydro-11b-H-benzopyridocoline; 6,7-diethyl-3,4-dihydroisoquinoline and β - mercapto-n-caproic acid react to afford 1-thia-2-(n-propyl)-4-oxo-9,10 - diethyl-1,2,3,4,6,7-hexahydro-11b-H-benzopyridocoline; 6,7-di(n-butyl)-3,4-dihydroisoquinoline and β-mercapto-n-caprylic acid react to afford 1-thia-2-(n-amyl)-4-oxo-9,10-di(n - butyl)-1,2,3,4,6,7-hexahydro-11b-H-benzopyrrocoline; and 6,7-di(isoamyl)-3,4-dihydroisoquinoline and β-mercapto-n-capric acid react to afford 1-thia-2-(n-heptyl) - 4 - oxo-9,10-di(isoamyl)-1,2,3,4,6,7-hexahydro-11b-H-benzopyridocoline.

Example III

In a 65 ml. round-bottomed flask equipped with magnetic stirring apparatus and fitted with a reflux condenser and nitrogen inlet tube, there were placed 4.78 g. (0.025 mole) of 6,7-dimethoxy-3,4-dihydroisoquinoline and 2.42 g. (0.026 mole) of mercaptoacetic acid in 50 ml. of dry benzene. Stirring was then commenced and the resulting yellow-green turbid mixture was placed under a nitrogen atmosphere. As soon as complete solution had occurred (with the aid of gentle heating), the reaction mixture was refluxed for six hours and then allowed to stand for an additional 16 hours at room temperature. Upon completion of this step, the benzene solvent was removed by means of evaporation under reduced pressure to afford a tacky solid, which was subsequently dissolved in 50 ml. of chloroform and allowed to crystallize. In this manner, there was obtained a 64% yield of 1-thia-3-oxo-8,9-dimethoxy,1,2,3,5,6-pentahydro-10b-H-benzopyrrocoline in the form of a white crystalline material melting at 169–171° C.

*Analysis.*—Calcd. for $C_{13}H_{15}NO_3S$: C, 58.85; H, 5.70; N, 5.28. Found: C, 59.02; H, 5.70; N, 5.15.

Example IV

The procedure described in Example III is followed except that 4.08 g. (0.025 mole) of 6,7-dihydroxy-3,4-dihydroisoquinoline is reacted with 2.76 g. (0.026 mole) of α-mercapto-n-propionic acid to afford 1-thia-2-methyl-3 - oxo - 8,9 - dihydroxy - 1,2,3,5,6 - pentahydro - 10b-H-benzopyrrocoline. Similarly, 4.78 g. (0.025 mole) of 6,7-diethoxy-3,4-dihydroisoquinoline and 3.12 g. (0.026 mole) of α-mercapto-n-butyric acid react to afford 1-thia-2 - ethyl - 3 - oxo - 8,9 - diethoxy - 1,2,3,5,6 - pentahydro-10b-H-benzopyrrocoline. In the same manner and employing appropriate molar amounts of reactants in each case, 3-methyl-6,7-di(n-butoxy)-3,4-dihydroisoquinoline and α-mercaptoisovaleric acid react to afford 1-thia-2-isopropyl - 3 - oxo - 5 - methyl - 8,9 - di(n - butoxy)-1,2,3,5,6 - pentahydro - 10b - H - benzopyrrocoline; 3 - ethyl - 6,7 - di(isoamyloxy) - 3,4 - dihydroisoquinoline and α-mercapto-n-caproic acid react to afford 1-thia-2-(n - butyl) - 3 - oxo - 5 - ethyl - 8,9 - di(isoamyloxy)-1,2,3,5,6 - pentahydro - 10b - H - benzopyrrocoline; 6,7-methylenedioxy-3,4-dihydroisoquinoline and α-mercapto-n-caprylic acid react to afford 1-thia-2-(n-hexyl)-3-oxo-8,9 - methylenedioxy - 1,2,3,5,6 - pentahydro - 10b - H-benzopyrrocoline; and 3-(n-butyl)-6,7-dimethyl-3,4-dihydroisoquinoline and α-mercapto-n-capric acid react to afford 1 - thia - 2 - (n - octyl) - 3 - oxo - 5 - (n - butyl)-8,9 - dimethyl - 1,2,3,5,6 - pentahydro - 10b - H - benzopyrrocoline.

Example V

The procedure described in Example II is followed except that 3.8 g. (0.02 mole) of 6,7-dimethoxy-3,4-dihydroisoquinoline is reacted with 2.4 g. (0.02 mole) of γ-mercapto-n-butyric acid to afford naphth-[1,2-a]-5-oxo-9,10,dimethoxy-2,3,4,5,6,7-hexahydro-11b-H - [1,5a]thiazepine. In the same manner and employing equimolar amounts of reactants in each case, 6,7-diethoxy-3,4-dihydroisoquinoline and γ-mercapto-n-valeric acid react to afford napth-[1,2-a]-2-methyl-5-oxo-9,10-diethoxy-2,3,-4,5,6,7-hexahydro-11b-H-[1,5a]thiazepine; 3-methyl-16,7-di(n-butoxy)-3,4-dihydroisoquinoline and γ-mercapto-n-caproic acid react to afford naphth-[1,2-a]-2-ethyl-5-oxo-6-methyl-9,10-di(n-butoxy)-2,3,4,5,6,7-hexahydro 11b-H-[1,5a]thiazepine; 3-ethyl-6,7-di(isoamyloxy)-3,4-dihydroisoquinoline and γ-mercapto-n-caprylic acid react to afford naphth - [1,2-a] - 2-(n-butyl)-5-oxo-6-ethyl-9,10-di-(isoamyloxy)2,3,4,5,6,7-hexahydro-11b-H - [1,5a]thiazepine; 6,7-dihydroxy-3,4-dihydroisoquinoline and γ-mercapto-n-capric acid react to afford naphth-[1,2-a]-2-(n-hexyl)-5-oxo-9,10-dihydroxy-2,3,4,5,6,7-hexahydro - 11b-H - [1,5a]thiazepine; 6,7-methylenedioxy-3,4-dihydroisoquinoline and γ-mercapto-n-lauric acid react to afford naphth - [1,2-a]-2-(n-octyl)-5-oxo-9,10 - methylenedioxy-2,3,4,5,6,7 - hexahydro - 11b - H - [1,5a]thiazepine; 3-(n-butyl)-6,7-dimethyl-3,4 - dihydroisoquinoline and γ-mercapto-n-butyric acid react to afford naphth-[1,2-a]-5-oxo-6- (n-butyl) - 9,10-dimethyl-2,3,4,5,6,7-hexahydro-11b-H-[1,5a]thiazepine; 6,7-diethyl-3,4-dihydroisoquinoline and γ-mercapto-n-valeric acid react to afford naphth-[1,2-a]-2-methyl-5-oxo-9,10-diethyl-2,3,4,5,6,7 - hexahydro - 11b-H-[1,5a]thiazepine; 6,7-di(n-butyl)-3,4,-dihydroisoquinoline and γ-mercapto-n-caproic acid react to afford naphth-[1,2-a]-2-ethyl-5-oxo-9,10 - di(n-butyl) - 2,3,4,5,6,7-hexahydro-11b-H-[1,5a]thiazepine; and 6,7-di(isoamyl)-3,4-dihydroisoquinoline and γ-mercapto-n-caprylic acid react to afford naphth-[1,2-a]-2-(n-butyl)-5-oxo-9,10-di(isoamyl)-2,3,4,5,6,7-hexahydro-11b-H-[1,5a]thiazepine.

Example VI

In a 250 ml. three-necked, round-bottomed flask equipped with magnetic stirring apparatus and fitted with a reflux condenser and nitrogen inlet tube, there were placed 2.46 g. (0.0129 mole) of 6,7-dimethoxy-3,4-dihydroisoquinoline and 2.57 g. (0.015 mole) of o-mercaptobenzoic acid in 100 ml. of benzene. Stirring was then commenced and the entire system was placed under a nitrogen atmosphere. As soon as complete solution was effected (with the aid of gentle heating), the reaction mixture was refluxed for 21 hours. Upon completion of this step, the benzene solvent was removed by means of evaporation under reduced pressure to afford a residual dark-green, viscous oil which was subsequently partitioned between 50 ml. of 5% sodium hydroxide and 50 ml. of chloroform. The separated chloroform layer was then washed with one-100 ml. portion of water and subsequently dried over anhydrous sodium sulfate. After removal of the drying agent by means of filtration, the dried filtrate was concentrated in vacuo to afford a greenish-yellow viscous oil. The latter substance was then dissolved in a hexane-benzene solution and subsequently allowed to crystallize therefrom. In this manner, there were obtained 2.3 g. (55%) of 1-thia-6-oxo-11,12-dimethoxy-1,6,8,9-tetrahydro-13b-H-dibenzo[a,g]pyridocoline as a yellow solid melting at 102–104° C.

Analysis—Calcd. for $C_{18}H_{17}NO_3S$: C, 66.03; H, 5.24; N, 4.28. Found: C, 66.11; H, 5.46; N, 3.78.

*Example VII*

The procedure described in Example VI is followed except that 2.1 g. (0.0129 mole) of 6,7-dihydroxy-3,4-dihydroisoquinoline is reacted with 2.53 g. (0.015 mole) of o-mercapto-5-toluic acid to afford 1-thia-4-methyl-6-oxo-11,12-dihydroxy-1,6,8,9 - tetrahydro - 13b - H-dibenzo[a,g]pyridocoline. Similarly, 2.83 g. (0.0129 mole) of 6,7-diethoxy-3,4-dihydroisoquinoline and 2.83 g. (0.015 mole) of o-mercapto-5-chlorobenzoic acid react in 100 ml. of benzene to afford 1-thia-4-chloro-6-oxo-11,12-diethoxy-1,6,8,9-tetrahydro-13b-H - dizenso[a,g]pyridocoline. In the same manner and employing appropriate molar amounts of reactants in each case, 3-methyl-6,7-di-(n-butoxy) - 3,4 - dihydroisoquinoline and o-mercapto-5-bromobenzoic acid react to afford 1-thia-4-bromo-6-oxo-8 - methyl - 11,12 - di(n - butoxy) - 1,6,8,9 - tetrahydro-13b-H-dibenzo[a,g]pyridocoline; 3-ethyl-6,7-di-(isoamyloxy)-3,4-dihydroisoquinoline and o-mercapto-5-anthranilic acid react to afford 1-thia-4-amino-8-ethyl-11,12-di(isoamyloxy) - 1,6,8,9 - tetrahydro - 13b - H - dibenzo[a,g] pyridocoline; 6,7-methylenedioxy-3,4-dihydroisoquinoline and o-mercapto-5-salicylic acid react to afford 1-thia-4-hydroxy - 6 - oxo - 11,12 - methylenedioxy - 1,6,8,9 - tetrahydro-13b-H-dibenzo[a,g]pyridocoline; 3 - (n-butyl)-6,7-dimethoxy-3,4-dihydroisoquinoline and o-mercapto-5-methoxybenzoic acid react to afford 1-thia-4-methoxy-6-oxo - 8 - (n - butyl) - 11,12 - dimethoxy - 1,6,8,9 - tetrahydro-13b-H-dibenzo[a,g]pyridocoline.

*Example VIII*

To a well-stirred, chilled (0° C.) chloroform solution containing 8.37 g. (0.030 mole) of 1-thia-4-oxo-9,10-dimethoxy - 1,2,3,4,6,7 - hexahydro - 11b - H - benzopyridocoline, there was added 4.2 g. (0.030 mole) of perbenzoic acid dissolved in 50 ml. of chloroform. After stirring the reaction mixture at 0° C. for one hour and then at room temperature for an additional hour, the solvent was removed by means of evaporation under reduced pressure and the residual material extracted with 10% aqueous sodium hydroxide solution in order to remove the benzoic acid. The so treated material was then taken up in chloroform, filtered and the resulting filtrate subsequently dried over anhydrous sodium sulfate. Removal of the chloroform from the dried solution in the usual manner afforded the desired 1-thiaoxo-4-oxo-9,10-dimethoxy - 1,2,3,4,6,7 - hexahydro - 11b - H - benzopyridocoline.

In the same manner, 1-thia-3-oxo-8,9-dimethoxy-1,2,3,5,6-pentahydro-10b-H-benzopyrrocoline is converted to 1-thiaoxo - 3 - oxo - 8,9 - dimethoxy - 1,2,3,5,6 - pentahydro-10b-H-benzopyrrocoline; naphth - [1,2-a]-5-oxo-9,10-dimethoxy - 2,3,4,5,6,7 - hexahydro - 11b - H - [1,5a]thiazepine is converted to naphth-[1,2a]-1,5-dioxo-9,10-dimethoxy - 2,3,4,5,6,7 - hexahydro - 11b - H - [1,5a]thiazepine; and 1-thia - 6-oxo-11,12-dimethoxy-1,6,8,9-tetrahydro-13b-H-dibenzo[a,g]pyridocoline is converted to 1-thiaoxo - 6 - oxo - 11,12 - dimethoxy - 1,6,8,9 - tetrahydro-13b-H-dibenzo[a,g]pyridocoline.

In like manner, all the other 1-thia compounds previously reported in the foregoing examples are each individually converted to their corresponding sulfoxides in accordance with this very same reaction procedure.

*Example IX*

The procedure described in Example VIII is followed except for the fact that the amount of perbenzoic acid employed is exactly twice the amount used in the previous example; in each case, the corresponding dioxosulfur heterocycle is the product obtained. Thus, 1-thia-4-oxo-9,10 - dimethoxy - 1,2,3,4,6,7 - hexahydro - 11b - H - benzopyridocoline is converted to 1-thiadioxo-4-oxo-9,10-dimethoxy - 1,2,3,4,6,7 - hexahydro - 11b - H - benzopyridocoline; 1-thia-3-oxo-8,9-dimethoxy-1,2,3,5,6-pentahydro-10b-H-benzopyrrocoline is converted to 1-thiadioxo - 3 - oxo - 8,9 - dimethoxy-1,2,3,5,6-pentahydro-10b-H-benzopyrrocoline; naphth - [1,2-a]-5-oxo-9,10-dimethoxy - 2,3,4,5,6,7 - hexahydro - 11b - H - [1,5a]thiazepine is converted to 1,1,5-trioxo-9,10-dimethoxy-2,3,4,5,6,7-hexahydro-11b-H-[1,5a]thiazepine; and 1-thia-6-oxo-11,12 - dimethoxy - 1,6,8,9 - tetrahydro - 13b - H - dibenzo[a,g]pyridocoline is converted to 1-thiadioxo-6-oxo-11,12-dimethoxy - 1,6,8,9 - tetrahydro - 13b - H - dibenzo - [a,g]pyridocoline. In like manner, all the other 1-thia compounds previously reported in the foregoing examples are each individually converted to their corresponding sulfones in accordance with this very same reaction procedure.

*Example X*

A dry solid pharmaceutical composition was prepared by blending the following materials in the proportions by weight specified:

| | |
|---|---|
| 1 - thia - 4 - oxo - 9,10 - dimethoxy - 1,2,3,4,6,7 - hexahydro - 11b - H - benzopyridocoline | 10 |
| Sodium citrate | 50 |
| Alginic acid | 20 |
| Polyvinylpyrrolidone | 15 |
| Magnesium stearate | 5 |

After the dried composition was thoroughly blended, tablets were punched from the resulting mixture, each tablet being of such size that it contained 50 mg. of the active ingredient.

*Example XI*

A dry solid pharmaceutical composition was prepared by combining the following materials in the proportions by weight specified:

| | |
|---|---|
| 1-thia-6-oxo-11,12-dimethoxy - 1,2,3,4-tetrahydro-13b-H-dibenzo[a,g]pyridocoline | 10 |
| Polyethylene glycol (average molecular weight, 4000) | 30 |
| Lactose | 40 |
| Calcium carbonate | 20 |

The dried solid mixture so prepared was thoroughly agitated so as to obtain a powdered product that was completely uniform. Soft elastic and hard shelled gelatin capsules containing this pharmaceutical composition were then prepared, employing a sufficient quantity of material so as to furnish 125 mg. of the active ingredient in each capsule.

*Example XII*

An aqueous propylene glycol solution containing 1-thia-3-oxo-8,9-dimethoxy-1,2,3,5,6-pentahydro - 10b - H-benzopyrrocoline was prepared by dissolving the latter compound in propylene glycol-water (9:1 by weight) with the aid of gentle heating. The amount of compound employed was such that the resulting solution contained 5 mg. of the active ingredient per ml. After cooling to room temperature, it was sterilized by means of filtration through a Seitz filter. The sterile aqueous propylene glycol solution so obtained was suitable for intramuscular administration to animals.

What is claimed is:

1. A compound selected from the class of organic nitrogen heterocycles corresponding to the structural formula:

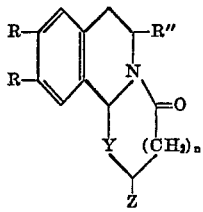

wherein R is a member of the group consisting of hydroxy, lower alkoxy and alkyl having from one to five carbon atoms and both R groups taken together form a methylenedioxy group, n is an integer in the range of 0–2 inclusive, Y is a member of the group consisting of sulfur, oxosulfur and dioxosulfur, Z is a member of the group consisting of hydrogen and alkyl having from one to eight carbon atoms, and R" is a member of the group consisting of hydrogen and lower alkyl.

2. 1-thia-3-oxo-8,9-dimethoxy - 1,2,3,5,6 - pentahydro-10b-H-benzopyrrocoline.

3. 1-thia-4-oxo-9,10-dimethoxy - 1,2,3,4,6,7 - hexahydro-11b-H-benzpyridocoline.

4. Naphth-[1,2-a]-5-oxo - 9,10 - dimethoxy-2,3,4,5,6,7-hexahydro-11b-H-[1,5a]thiazepine.

5. The process which comprises reacting a 6,7-disubstituted-3,4-dihydroisoquinoline having the structural formula:

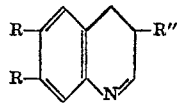

wherein R is a member of the group consisting of hydroxy, lower alkoxy and alkyl having from one to five carbon atoms and both R groups taken together form a methylenedioxy group, and R" is a member of the group consisting of hydrogen and lower alkyl, with a mercapto-substituted lower alkane hydrocarbon carboxylic acid having the general formula HSCHZ(CH$_2$)$_n$COOH wherein n is an integer in the range of 0–2 inclusive and Z is a member of the group consisting of hydrogen and alkyl having from one to eight carbon atoms, said reaction being conducted in a reaction-inert organic solvent medium at a temperature that is in the range of from 20° C. to about 150° C. for from about two to about 24 hours.

6. A compound selected from the class of organic nitrogen heterocycles corresponding to the structural formula:

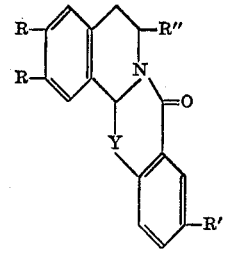

wherein R is a member of the group consisting of hydroxy, lower alkoxy and alkyl having from one to five carbon atoms and both R groups taken together form a methylenedioxy group, Y is a member of the group consisting of sulfur, oxosulfur and dioxosulfur, R' is a member of the group consisting of hydrogen, methyl, chlorine, bromine, amino, hydroxy and methoxy, and R" is a member of the group consisting of hydrogen and lower alkyl.

7. 1-thia-6-oxo-11,12-dimethoxy - 1,6,8,9 - tetrahydro-13b-H-dibenzo[a,g]-pyridocoline.

8. 1-thia-4-chloro - 6 - oxo - 11,12 - diethoxy - 1,6,8,9-tetrahydro-13b-H-dibenzo[a,g]pyridocoline.

9. 1-thia-4-hydroxy - 6 - oxo - 11,12 - methylenedioxy-1,6,8,9-tetrahydro-13b-H-dibenzo[a,g]pyridocoline.

10. The process which comprises reacting a 6,7-disubstituted-3,4-dihydroisoquinoline having the structural formula:

wherein R is a member of the group consisting of hydroxy, lower alkoxy and alkyl having from one to five carbon atoms and both R groups taken together form a methylenedioxy group, and R" is a member of the group consisting of hydrogen and lower alkyl, with a mercapto-substituted aromatic hydrocarbon carboxylic acid having the structural formula:

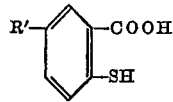

wherein R' is a member of the group consisting of hydrogen, methyl, chlorine, bromine, amino, hydroxy and methoxy.

No references cited.